United States Patent [19]

Bengtsson et al.

[11] Patent Number: 4,815,911

[45] Date of Patent: Mar. 28, 1989

[54] DEVICE FOR TORSION-PROOF CONNECTION OF AN ELEMENT IN A ROBOT ARM OR THE LIKE

[75] Inventors: Bengt G. Bengtsson, Angered; Ove Larsson; Per Lenschow, both of Göteborg, all of Sweden

[73] Assignee: Komatsu, Ltd., Tokyo, Japan

[21] Appl. No.: 76,990

[22] Filed: Jul. 20, 1987

Related U.S. Application Data

[63] Continuation of Ser. No. 590,581, filed as PCT SE83/00269 on Jul. 4, 1983, published as WO84/00125 on Jan. 19, 1984, abandoned.

[30] Foreign Application Priority Data

Jul. 5, 1982 [SE] Sweden .................... 8204126

[51] Int. Cl.⁴ .............................................. B25J 1/00
[52] U.S. Cl. ............................................. 414/7; 901/21; 446/368; 403/121
[58] Field of Search ................. 414/7; 901/21, 22, 33, 901/28; 623/57; 446/308; 403/383, 121; 267/158, 164, 166; 74/469, 501 RM, 479

[56] References Cited

U.S. PATENT DOCUMENTS

| | | | |
|---|---|---|---|
| 3,274,850 | 9/1966 | Tascio | 74/501 |
| 3,284,964 | 11/1966 | Saito | 414/7 X |
| 3,465,997 | 9/1969 | Piske | 267/160 X |
| 3,932,045 | 1/1976 | Hilberry et al. | 403/121 |
| 4,107,948 | 8/1978 | Molaug | 414/7 X |
| 4,267,608 | 5/1981 | Bora, Jr. | 403/121 X |
| 4,393,728 | 7/1983 | Larson et al. | 414/7 X |
| 4,494,417 | 1/1985 | Larson et al. | 414/7 X |
| 4,499,784 | 2/1985 | Shum | 901/29 X |

FOREIGN PATENT DOCUMENTS

| | | | |
|---|---|---|---|
| 156340 | 4/1978 | Netherlands | 414/7 |
| 1184666 | 10/1985 | U.S.S.R. | 901/28 |

Primary Examiner—Robert J. Spar
Assistant Examiner—Jennifer L. Doyle
Attorney, Agent, or Firm—Holman & Stern

[57] ABSTRACT

A device for torsion-proof connection of a number of elements (11, 12) in direct or indirect rolling contact with each other, which together make a robot arm or the like, whereby the elements are held together and actuated by force transmitting actuators, for example cords. The object of the present invention is to provide a device with which the individual elements of a robot arm can be torsionally locked so that it can bear significant torsional forces without detoriating the rolling characteristics of the elements. This object has been achieved by the fact that the elements (11, 12; 15) pairwise, with their rolling surfaces (13) turned towards each other, being connected with each other through a torsion member (14) which is flexible and/or joined in the rolling direction of the elements (11, 12) and which has a great stiffness across the rolling direction.

18 Claims, 8 Drawing Sheets

DEVICE FOR TORSION-PROOF CONNECTION OF AN ELEMENT IN A ROBOT ARM OR THE LIKE

This is a continuation of application Ser. No. 590,581, filed as PCT SE83/00269 on Jul. 4, 1983, published as WD84/00125 on Jan. 19, 1984, now abandoned.

CROSS REFERENCE TO RELATED APPLICATION(S)

This U.S. application stems from PCT International Application No. PCT/SE83/00269 filed July 4, 1983.

BACKGROUND OF THE INVENTION

Field of the Invention

The present invention relates to a device for torsion-proof connection of a number of elements in direct or indirect rolling contact with each other, which together make a robot arm or the like, where the elements are held together and can be moved by force transmitting actuators, for example cords.

In the Swedish Pat. Nos. 7902366-9 and 8001998-7, which correspond in part to U.S. Pat. No. 4,393,728, a robot arm is described which is especially characterized by having a great flexibility in different planes, whereby its ability to get around barriers is great. It can thus be inserted in curved or angled spaces, which previously was almost impossible. The great flexibility of the robot arm is achieved because the arm consists of a larger number of disc-like elements which have a rolling contact with each other.

An absolute requirement for robot arms of this type is that in addition to a relatively large weight bearing capability at the free end of the arm it be possible to transmit torques and maintain large torsional moments. The relatively poor torsional resistance of cord maneuvered robot arms, which is caused by the rounded form of the individual elements, has indeed been improved through providing the rolling surfaces of the elements with teeth or the like, which engage each other, but in many cases another torsion locking of the elements is desirable.

BRIEF SUMMARY OF THE INVENTION

The object of the present invention is to provide a device with which the individual elements of a robot arm can be torsionally locked so that they can bear significant torsional forces without deteriorating the rolling characteristics of the elements. This object has been achieved by connecting at least the first and the last elements in an element pair or group of elements together through a torsion member which is flexible and/or jointed in the rolling direction of the elements and which has a great stiffness across the rolling direction.

BRIEF DESCRIPTION OF THE DRAWINGS

The invention will now be described in detail with reference to the accompanying drawings wherein.

DETAILED DESCRIPTION

Figure 1:
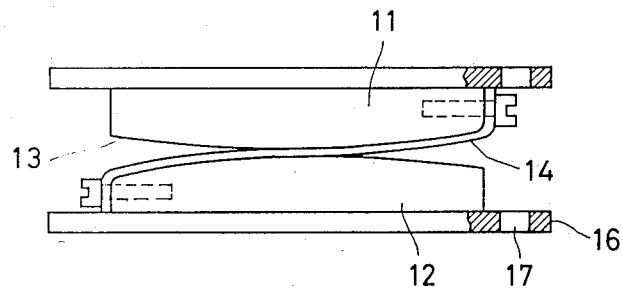
FIG. 1 is a side elevational view, partly in cross-section, of two cooperating elements provided with torsion members according to the invention.
Figure 2:
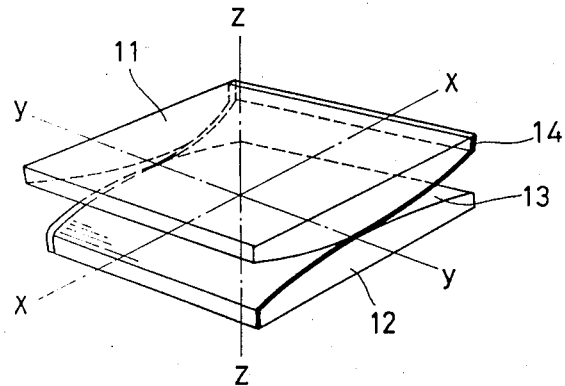
FIG. 2 is a perspective view of the elements of FIG. 1.

FIGS. 1 and 2 show an embodiment consisting of two identical elements 11 and 12 shaped with single-curved surfaces 13 facing toward each other, which are in rolling contact with each other and are connected with each other via a torsion member 14. This can consist of for example a steel wire, appropriately of spring steel, which is fastened at one end to the side edge of one element 11, while the other end is connected to the corresponding side edge of the other element 12 located directly opposite. The connection of the torsion member 14 with the elements can be achieved in a number of different ways, e.g. by welding, riveting, screw fastening or through grooves in the elements in which the ends of the torsion members are fixed.

The cooperating elements 11 and 12 cooperating in the above described way and the rolling surfaces 13 thereof which are turned toward each other, are called an element pair in the following description.

Figure 3:
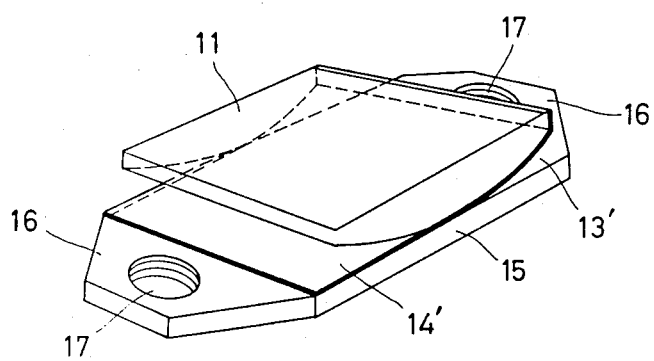
FIG. 3 is a perspective view of a modified embodiment of the elements shown in FIG. 2.

As is clear from FIG. 3 the two elements need not be shaped with single- or double curved rolling surfaces, but included in the scope of the invention is the possibility of shaping an element 15 for example as a plane 13' or even with a slightly convex or concave curve with significantly larger radius of curvature than the radius of curvature of the other cooperating element. In FIG. 3 the torsion member 14' is thus attached to the side edge of the element 11 by one end, while the other end is fastened to the plane element 15.

Figure 16:
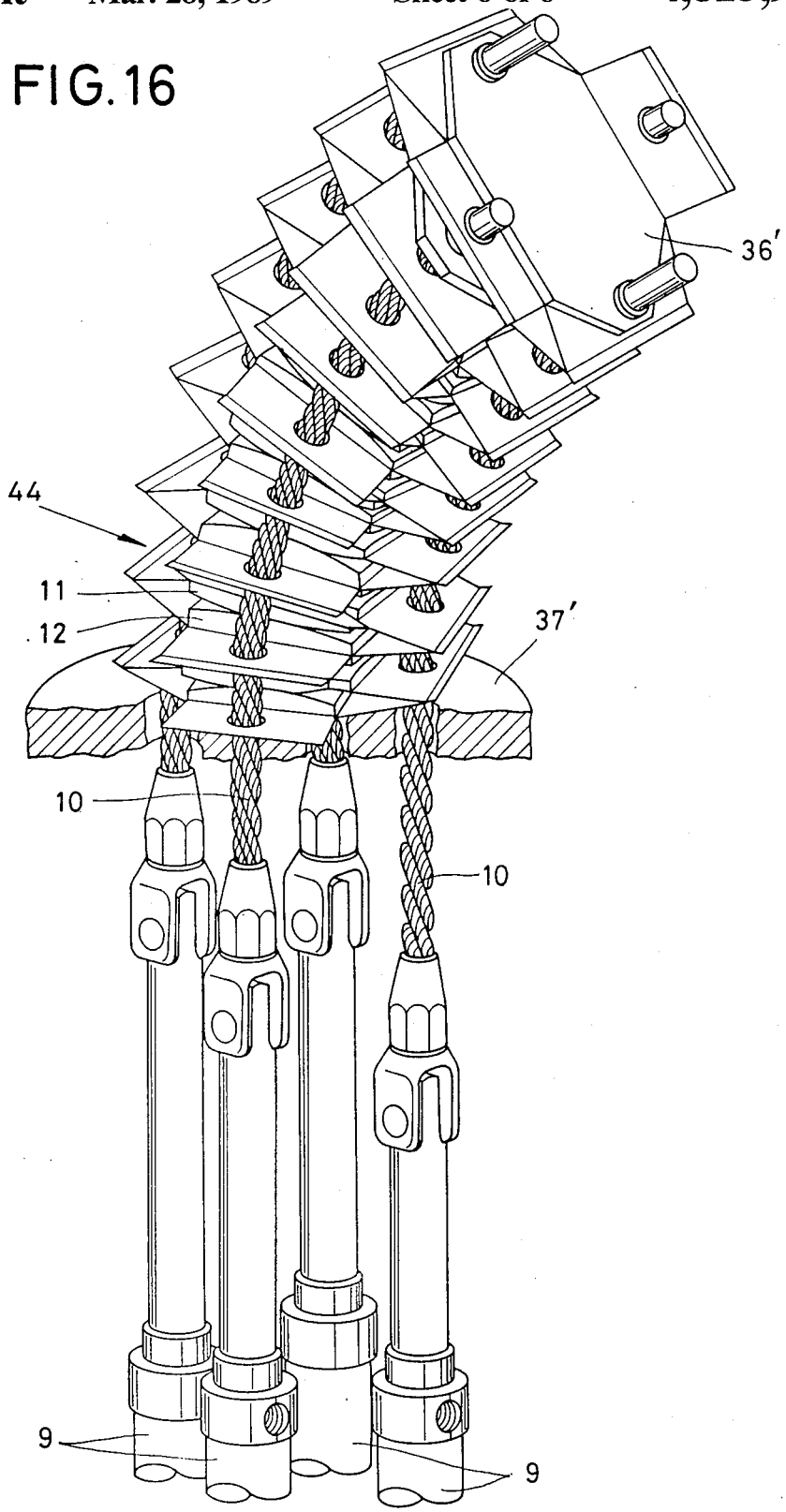
FIG. 16 is a perspective view of the lower part of a robot arm with torsion members according to the embodiment of FIG. 8.

The elements 11, 12 and 15, on the plane side from the rolling surface 13, 13' are provided with projecting portions 16, which contain holes 17 for receiving the cords 10 (FIG. 16) which are acted on by actuators 9 and which connect the first and last elements (outer elements) in a group of elements.

The element pairs can naturally be arranged in other relative rotational positions than the 90° mentioned. The element pairs can for example be rotatable only a few degrees relative to each other, so that they are placed in a screw line formation.

Figure 4:
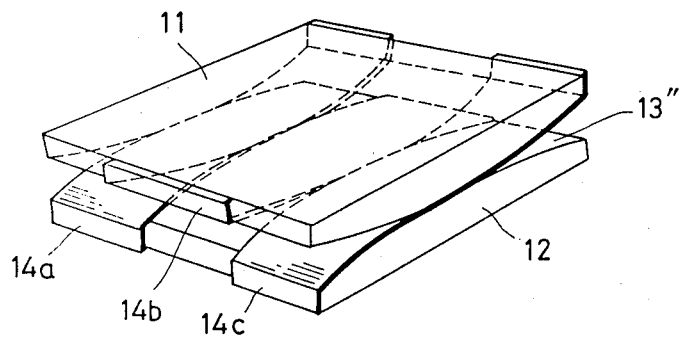
FIG. 4 is a perspective view which shows a variation of the torsion lock shown in FIGS. 1 and 2.

The torsion member 14 can extend over the whole width of the element, out it can also advantageously be divided into several narrower bands which are alternately connected with respective elements 14a, 14b, 14c, as shown in FIG. 4. As seen in FIG. 4, element 12 has spaced, raised shoulder portions 14a and 14c. The element 11 has a central, raised portion which is received between the shoulders 14a and 14c.

Figure 5:
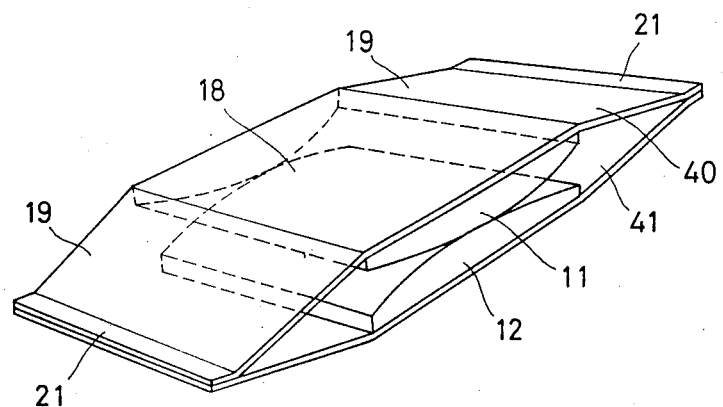
FIG. 5 is a perspective view of another embodiment of an element pair where the torque and force bearing members are placed outside the elements.

FIG. 5 shows an embodiment where the torsion members are placed outside the elements 11 and 12. Each element pair includes two torsion plates 40 and 41, which each include a central middle section 18 and on the sides thereof slightly angled side sections 19. At the outer end the torsion plate is provided with a narrow strip 21 which is mainly parallel to the middle section 18. The two torsion plates 40 and 41 are connected at the outer ends 21 for example by spot welding and in that way make a torsion member. Because the middle section 18 has mainly the same size and shape as the plane "back" surface of the elements 11 and 12, these will be locked against rotation relative to the torsion member.

Figure 6:
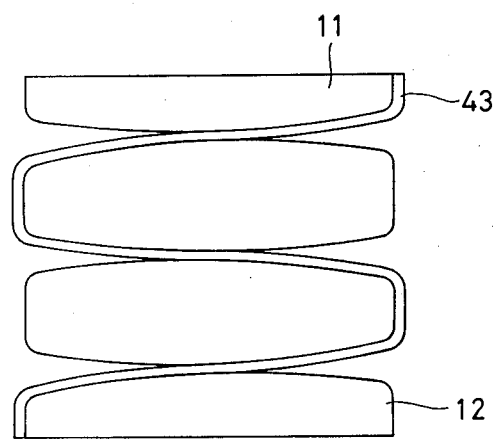
FIG. 6 is a side elevational view of a number of elements which have their rolling surfaces oriented in the same direction in accordance with the invention.

For certain applications it can be appropriate to arrange a group of elements with their rolling planes placed in the same direction as shown in FIG. 6, and in such arrangements it is possible to arrange the torsion member 43 as a continuous length which extends from the first element 11 to the last element 12 in the element group.

Figure 7:
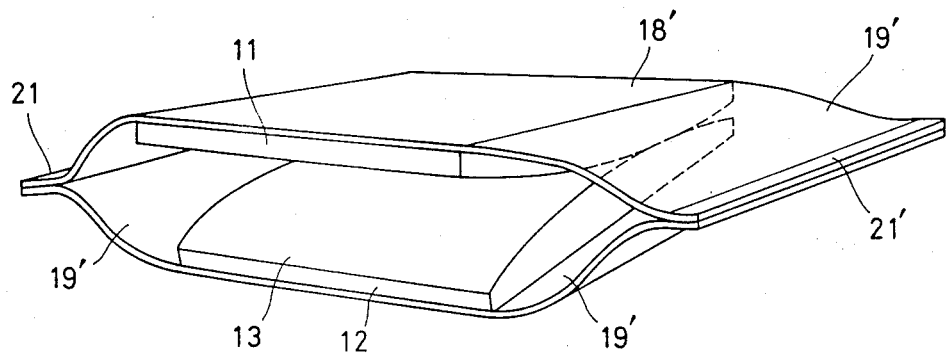
FIG. 7 is a perspective view of an additional embodiment where the torsion member is arranged across the rolling direction of the elements.

The side sections 19 of the torsion members outside the elements need not necessarily be arranged in the rolling direction of the elements as shown in FIG. 5, but can also be arranged perpendicular to the rolling direction is shown at 19' in FIG. 7. It is also possible to arrange the torsion members in both these directions, that is a combination of what is shown in FIGS. 5 and 7.

Figure 8:
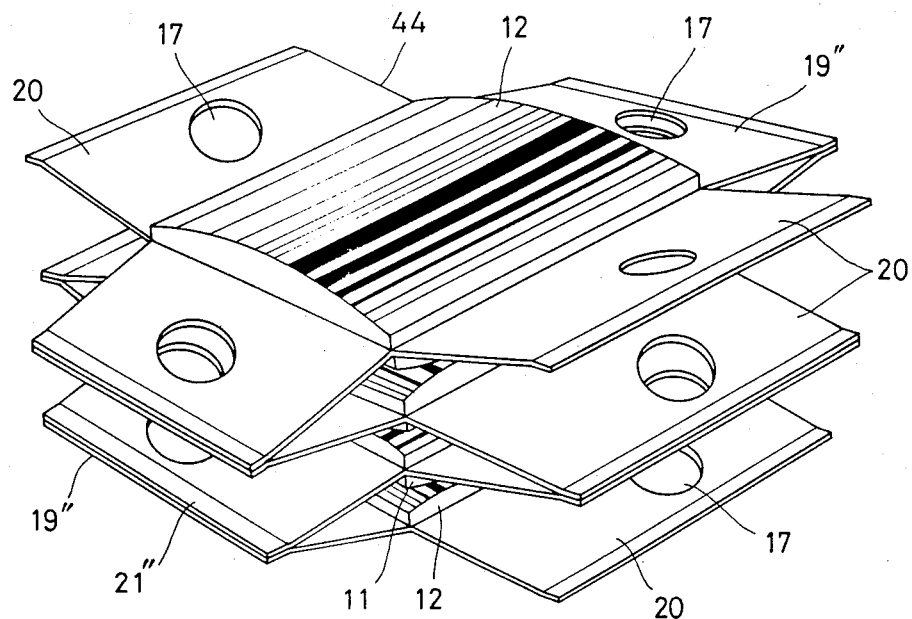
FIG. 8 is a perspective view of a cross-like embodiment of the torsion member.

In FIG. 8 is shown an embodiment where each individual torsion manner 44 is cross-shaped and made of an appropriate spring steel material. The cross-shaped member has a central part (not visible) for receiving elements 11 and 12 respectively on each opposite flat side so that the elements are on opposite sides of the central part. The elements do not belong to the same element pair but belong to respective pairs. The parts 19" outside the elements, that is one arm pair of the cross member, are both curved at an angle towards the central part, while the other outside parts 20 are curved in the opposite direction relative to the parts 19. The end parts 19", 20 of each arm pair are intended to be connected to the corresponding outer parts of the adjacent torsion member. The connection between the outer parts can be permanent, for example by welds, but other means of connection are possible, for instance screw fastenings.

Figure 9:
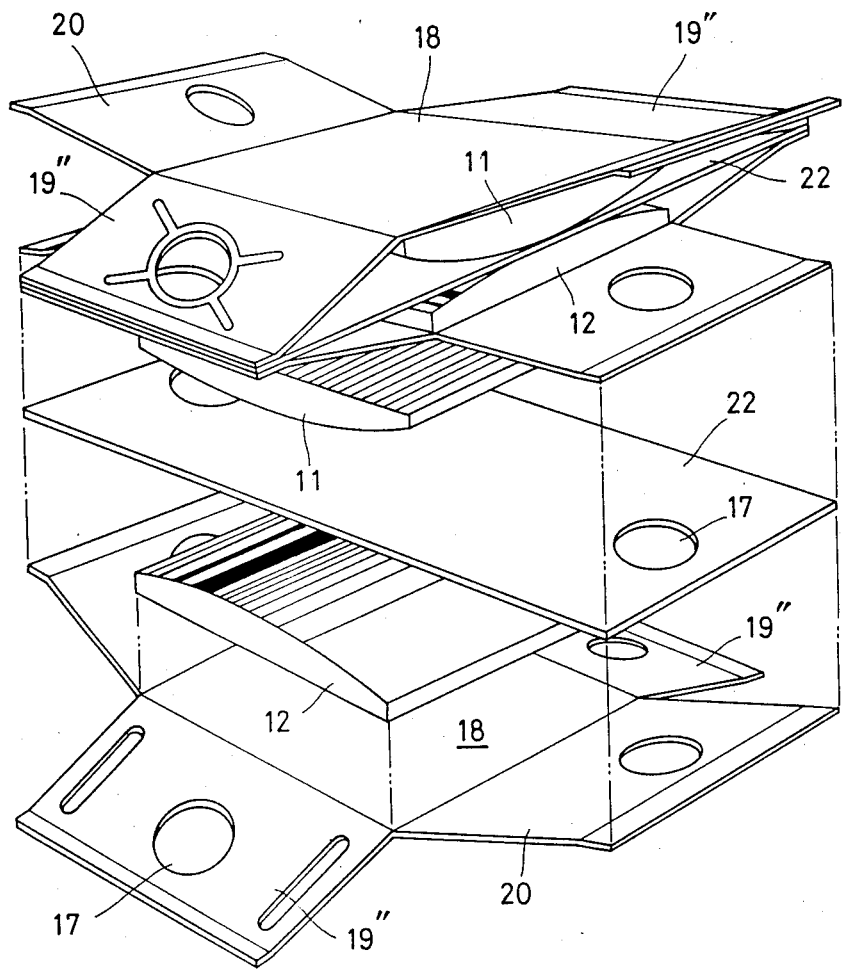
FIG. 9 is a perspective and partly exploded view of a modified embodiment of the variant shown in FIG. 5.

As can be seen in FIG. 8 the rolling direction of every sound element pair is rotated 90° relative to each other, so that the arms 19" and 20 respectively are placed in the direction of the extension of the rolling direction. In order to obtain an even stiffer construction a plane plate 22 can be placed between each element pair 11, 12, preferably of spring steel, which at both its ends is fastened to the ends of the parts 19" and 22, respectively, as shown in FIG. 9. Possibly the parts 19" and 20 can be shaped with stiffeners inserted in the plates, which is indicated on two parts.

Figure 10:
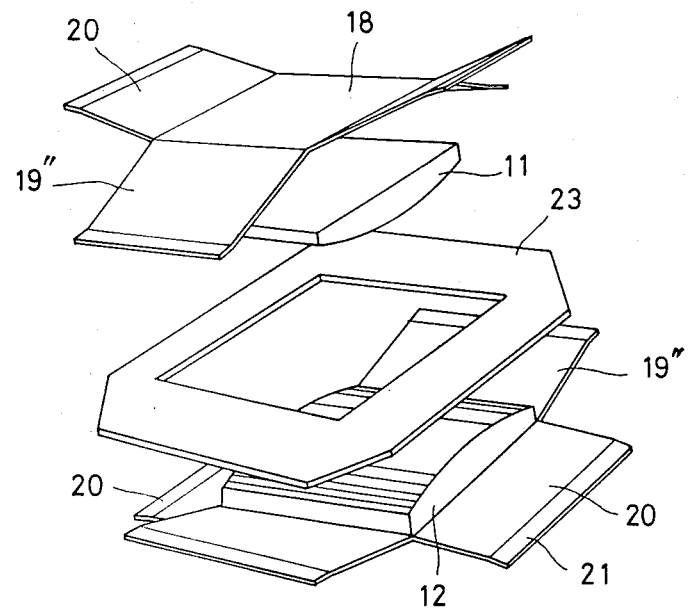
FIG. 10 is an exploded perspective view of an embodiment of the cross-like torsion member.

FIG. 10 shows an embodiment where the same great stiffness is obtained as in FIG. 9 but without affecting the flexibility of the arm pairs. This is obtained by replacing the plate 22 in FIG. 9 with a plate-shaped frame 23, which at a distance surrounds the element pair 11, 12. In the same way as the plate 22 the frame is fixed to the arms 19" and 20 respectively of two adjacent torsion members 44.

Figure 11:
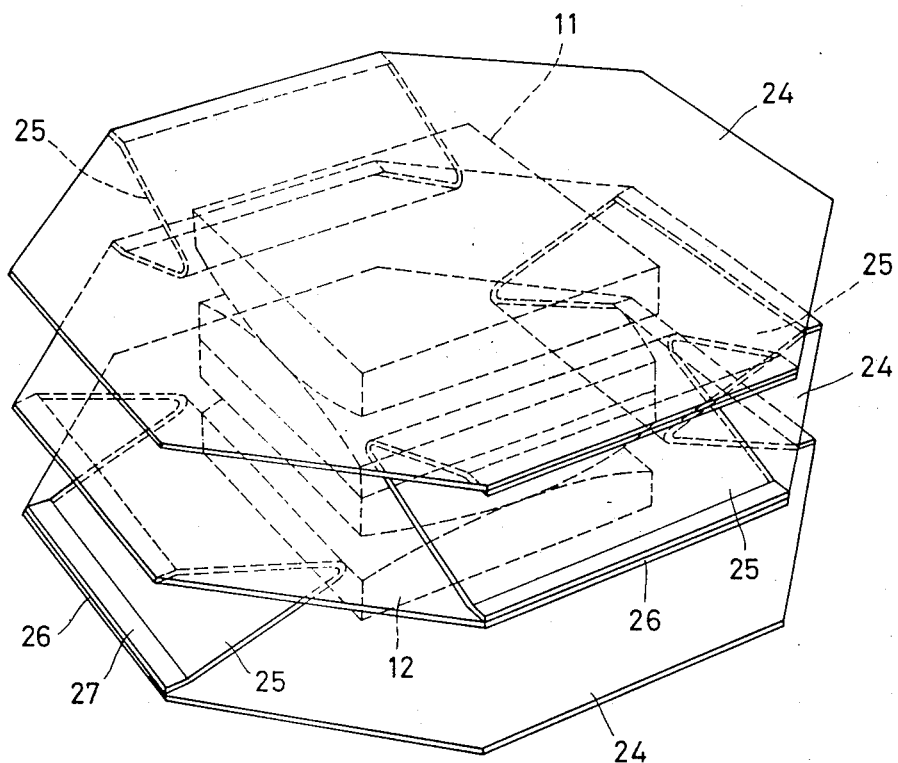
FIG. 11 is a perspective view of an additional embodiment of the torsion member according to the invention.

A further variant of the torsion members is shown in FIG. 11, where the members have a partially bellows-like form. Each torsion member comprises a planar member, for example an eight-sided plate, 24 which in the same way as the cross-shaped part according to FIGS. 8-10 is placed between two elements of an element pair and connecting pieces 25 in the extension of the rolling surface between two adjacent plates 24 the connecting pieces 25 having V-shaped cross sections, which are fastened by their shank ends 27 to the edge parts 26 of the plates 24.

Figure 12:
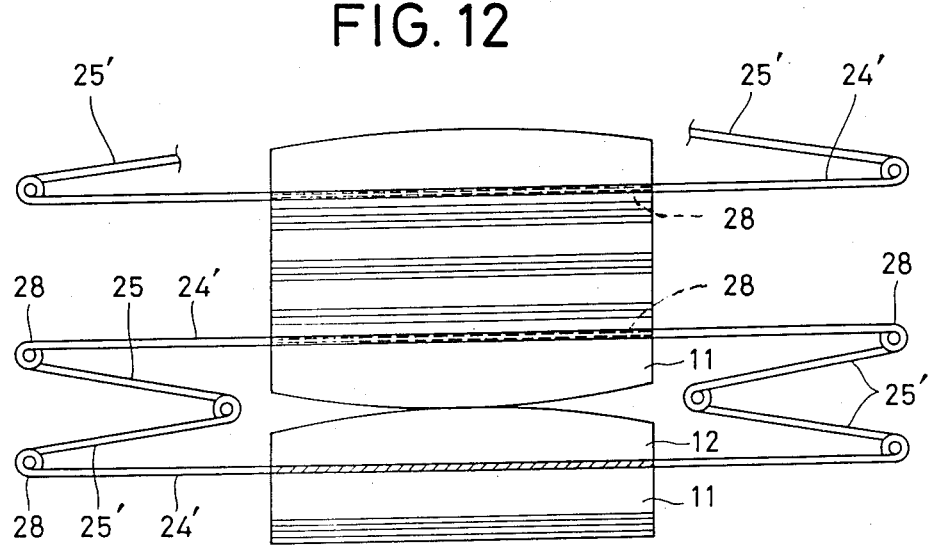
FIG. 12 is a side elevational view partly in cross section of a modification of the embodiment shown in FIG. 8.

In FIG. 12 is shown a modified embodiment of the device according to FIG. 11, where the fixed connections at the edge parts 27 and the shank ends 26 have been replaced by joint connections 28, for example, in the form of piano hinges.

Figure 13:
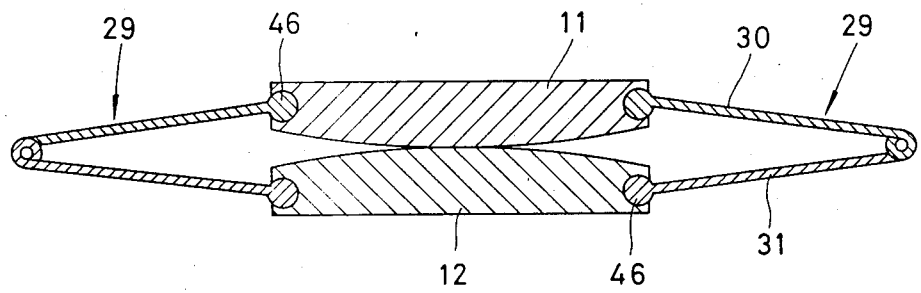
FIG. 13 is a side elevational view of an embodiment with pivotally connected torsion members.

Instead of connecting the plates 24' with connection pieces 25, as shown in FIG. 12, they can be attached to the elements 11 and 12 in a flexible bearing, which is shown in the embodiment according to FIG. 13. At the oppositely placed side edges of the elements 11, 12 are flexibly attached at 46 torsion members 29, which consist of two hinge flanges 30 and 31.

Figure 14:
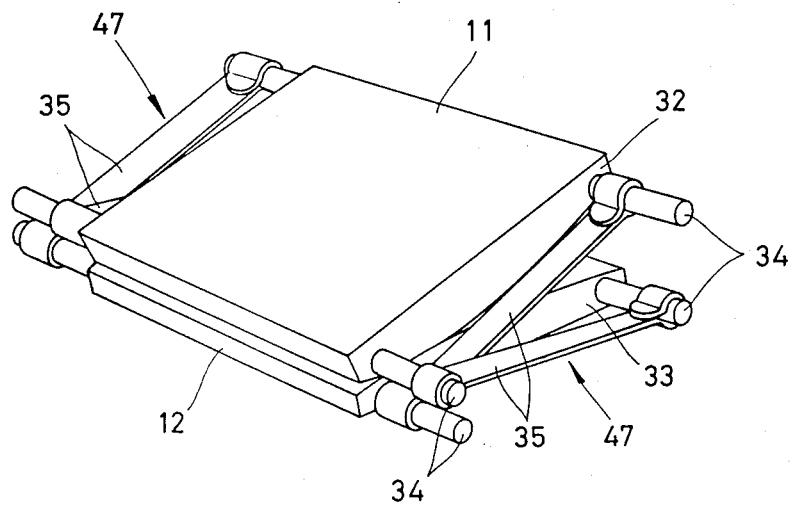
FIG. 14 is a perspective view of an additional embodiment of two elements provided with torsion members according to the invention.

An additional embodiment is shown in FIG. 14. On the end sides 32 and 33 of the elements 11 and 12, across the rolling direction of the elements at the beginning and final ends of the rolling surface, pins 34 are fixed, which act as bearing axles for the torsion members 47, which in this embodiment consist of steel bands 35, which are loop shaped at the ends for fitting the pins 34.

Figure 15:
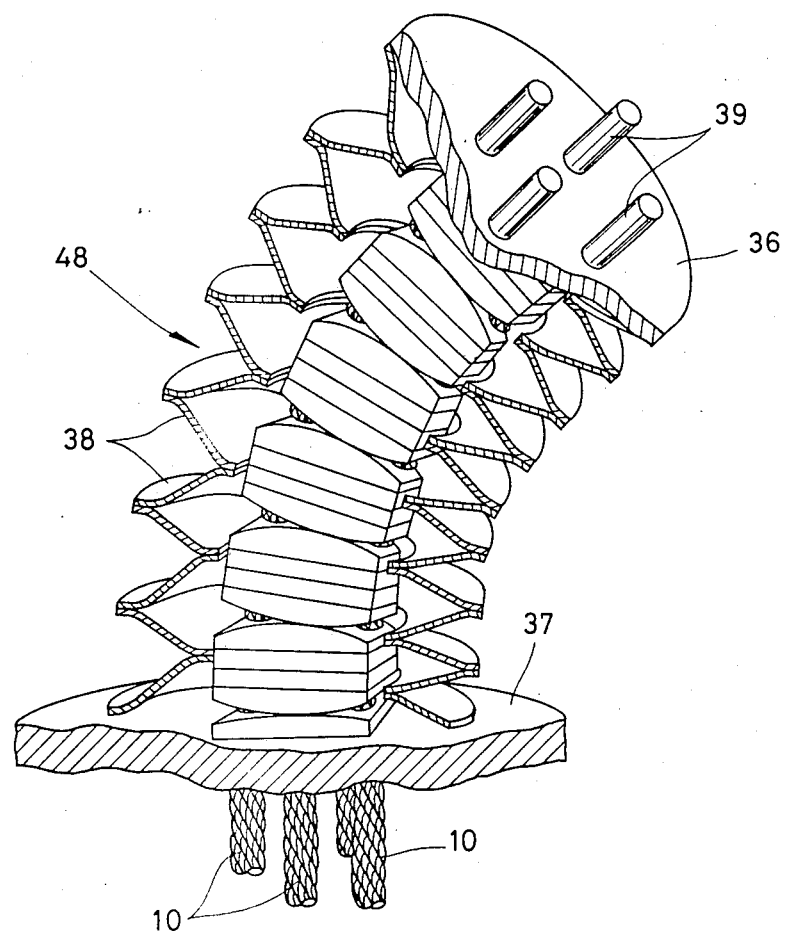
FIG. 15 is a perspective cross-sectional view of a further embodiment wherein torsion members are in the form of a bellows containing a group of elements.

In FIG. 15 is finally shown an embodiment where a group of elements has a continuous torsion member 48 in the form of a cross-sectionally preferably circular bellows, and where the folded bellows sides 38 are made of a stiff material. In this embodiment only the first and last elements of the group are connected with the end pieces 36 and 37 of the bellows, and the ends 39 of the wires 10 are attached to the end piece 36.

The invention is not limited to the embodiments shown and described, but a number of variations are possible within the scope of the claims. Thus the elements 11, 12 can be arranged in groups so that their rolling surface is turned in the same direction, said embodiment being appropriate if the robot arm is to perform a motion only in that direction. In the description and in the drawings only single-curved elements have been shown, but the torsion members according to the invention can of course also be used with elements with double curved rolling surfaces.

We claim:
1. A robot arm, comprising:
    a plurality of elements having single-curved contact surfaces in direct or indirect rolling contact with each other, said elements being held together and being actuated by an actuating means;

at least the first and last element in said plurality of elements being connected with each other through at least one joint of a stiff sheet material extending over at least substantially the entire width of the elements in a direction transverse to the rolling direction of the elements;

said joint being flexible in the rolling direction of the elements and being stiff in said direction transverse thereto;

said joint being a torsion member providing a substantially torsion-resistant connection between said elements.

2. A device according to claim 1, wherein each said torsion member comprises at least one band, having ends fastened to at least the first and the last elements of said plurality of elements through regions adjacent the ends of the respective rolling surfaces.

3. A device according to claim 2, wherein the torsion member comprises a plurality of bands which are alternatively connected to respective areas of the elements.

4. A device according to claim 1, wherein pairs of adjacent elements form element pairs having said contacting surfaces, and moment and power receiving parts of the torsion member are located outside said plurality of elements.

5. A device according to claim 4, wherein the torsion member comprises at least one bellows, the folded bellows walls being of a stiff material.

6. A device according to claim 1 wherein pairs of adjacent elements form element pairs having said contacting surfaces, and the torsion member comprises plates extending from each element in an element pair, which are connected to each other outside the elements.

7. A device according to claim 4, wherein each said member is cross-shaped and comprises two arm pairs and is formed with a central part arranged between two adjacent elements each belonging to a different element pair, the two arm pairs of the cross-shaped member being bent in opposite directions relative to each other, and each arm pair being connected to the arms of a respective corresponding adjacent member.

8. A device according to claim 7, wherein between the elements in each element pair a substantially planar plate is disposed which is connected by its ends to the arms of the cross shaped member.

9. A device according to claim 7, wherein between the cross arms of adjacent members located opposite to each other and connected to each other, there is attached an extending plate-shaped frame extending about a pair of elements.

10. A device according to claim 4, wherein each member comprises a substantially planar plate placed between two elements belonging each to a respective element pair and the plates in the extension of the rolling planes are equipped with V- or Bellows-shaped connecting pieces.

11. A device according to claim 4, wherein pins are disposed on sides of the elements near the ends of the rolling surfaces, and torsion members are cross-wise connected to said pins of connect the elements of each element pair.

12. A robot arm as claimed in claim 1, wherein:

said torsion member comprises a band means of relatively stiff sheet material having a first portion, a second portion, and an intermediate portion; and said plurality of elements comprises a first joint member element having a rolling contact surface, a first band attaching portion, and means for fixedly attaching said first portion of said band means to said first band attaching portion, and a second joint member element having a rolling contact surface, a second band attaching portion, and means for fixedly attaching said second portion of said band means to said second band attaching portion;

said band means being disposed between and in contacting engagement with respective rolling contact surfaces of said first and second joint member elements so that relative rolling movement of said first and second joint member elements results in a corresponding increase in contact area between said band means and one of said joint member elements and a corresponding decrease in contact area between said band means and the other one of said joint member elements.

13. A robot arm comprising:

a plurality of elements having rolling surfaces in cooperating rolling relationship with respect to each other in a rolling direction, at least one element of an adjacent pair of said elements having a curved rolling surface;

actuating means operatively related to said elements for holding said elements together and actuating said elements for producing cooperating rolling movement of said elements on said curved rolling surfaces in said rolling direction; and at least one torsion member of substantially sheet-like material, said material extending over at least substantially the entire width of at least an adjacent pair of said elements in a direction transverse to said rolling direction, connecting said adjacent pair of elements together, said at least one torsion member being flexible in said rolling direction and being substantially stiff in said transverse direction, so that said at least one torsion member provides a substantially torsion-resistant connection that retains said adjacent pair of elements in said cooperating rolling relationship in any position of rolling in said rolling direction and substantially prevents relative rotation between said adjacent pair of elements in said transverse direction.

14. A robot arm as claimed in claim 13 wherein:

said plurality of elements are positioned with said curved rolling surfaces in adjacent relationship;

each of said elements has opposite ends at the ends of said curved rolling surface in the rolling direction; and said torsion member extends between said adjacent curved rolling surfaces and has one end connected to one of said opposite ends of one of said elements and another end connected to one of said opposite ends of another element, so that said adjacent curved rolling surfaces are in rolling contact engagement with opposite sides of said torsion member.

15. A robot arm as claimed in claim 14 wherein:

each element of each adjacent pair of elements has a substantially planar surface on the side thereof opposite to said curved rolling surface;

planar means are provided on said planar surface;

projecting portions are provided on said planar means projecting in said rolling direction outwardly from positions adjacent said opposite ends of said element; and cooperating means are provided on at least some of said projecting portions in cooperative relationship with said actuating means to facilitate operation of said actuating means.

16. A robot arm as claimed in claim 14 wherein:
fastening means are provided for connecting said ends of said torsion member to said opposite ends of said elements.

17. A robot arm as claimed in claim 13 wherein:
said plurality of elements comprises a plurality of pairs of elements arranged in a longitudinal relationship; and
said curved rolling surfaces comprise oppositely-curved convex surfaces on each pair of elements.

18. A robot arm as claimed in claim 14 wherein:
said pairs of elements comprise a plurality of pairs of elements arranged in a longitudinal relationship; and
said curved rolling surfaces comprise oppositely-curved convex surfaces on each pair of elements.

* * * * *